(No Model.) 2 Sheets—Sheet 1.

P. M. SHARPLES.
CENTRIFUGAL BUTTER EXTRACTOR.

No. 497,417. Patented May 16, 1893.

Witnesses
E. J. Kelly.
David Levan

Inventor
Philip M. Sharples
By his Attorney (No Model.)
2 Sheets—Sheet 2.
P. M. SHARPLES.
CENTRIFUGAL BUTTER EXTRACTOR.
No. 497,417. Patented May 16, 1893.
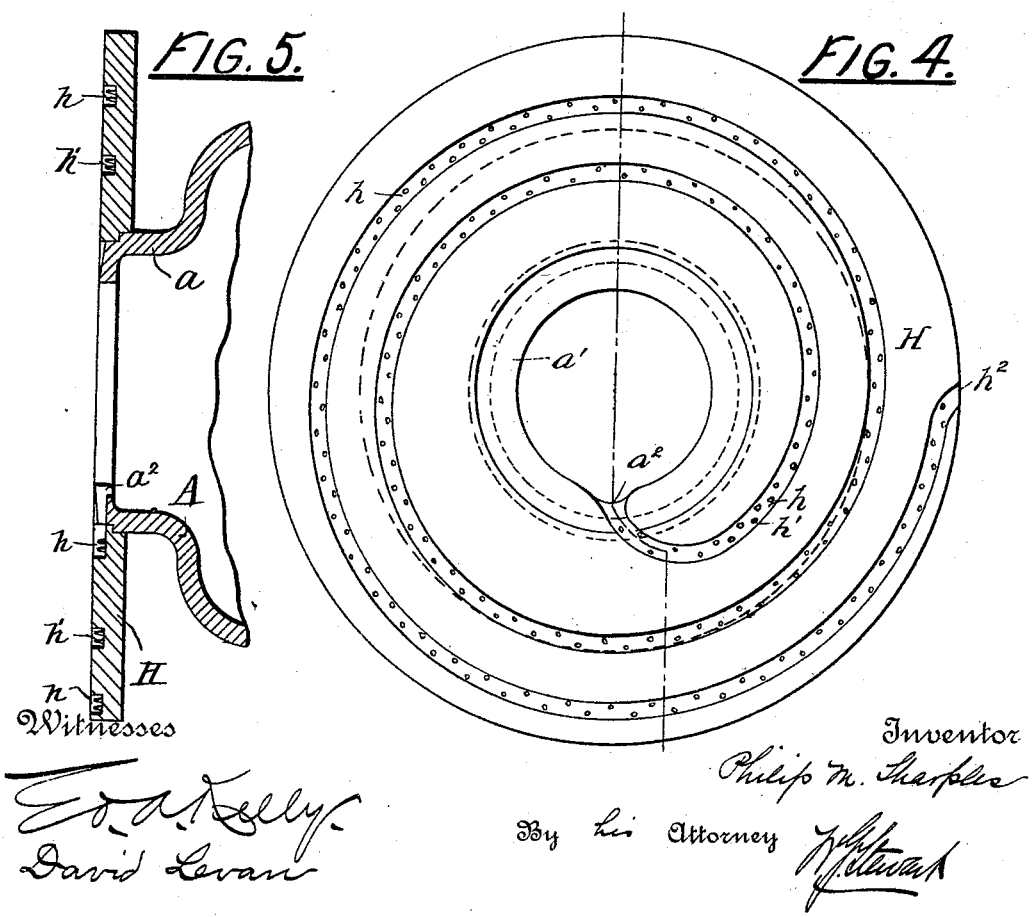

UNITED STATES PATENT OFFICE.

PHILIP M. SHARPLES, OF WEST CHESTER, PENNSYLVANIA.

CENTRIFUGAL BUTTER-EXTRACTOR.

SPECIFICATION forming part of Letters Patent No. 497,417, dated May 16, 1893.

Application filed September 10, 1890. Serial No. 364,521. (No model.)

*To all whom it may concern:*

Be it known that I, PHILIP M. SHARPLES, a citizen of the United States, residing at West Chester, in the county of Chester, State of Pennsylvania, have invented certain Improvements in Processes of and Apparatus for Manufacturing Butter, of which the following is a specification.

This invention relates mainly to a new and improved process of continuously extracting butter-fat from milk.

In an already well known continuous method the cream is separated from the skim milk by centrifugal action but instead of being discharged in the ordinary manner it is agitated while forming an inner wall of fluid in the centrifugal vessel, so as to develop the butter-fat, which is then delivered separately while the butter-milk is discharged with the skim milk. Cream has also been delivered from the centrifugal into another vessel where it has been churned, the inlet of cream and outlet of butter and butter-milk from the vessel being continuous.

The principle involved in my improved process consists in developing the butter-fat directly from a stream of the compound liquid containing it by means of the moving force or momentum of such stream.

In carrying out my process I prefer to separate the cream from the milk in a centrifugal vessel and to discharge it in a continuous stream as usual; instead of collecting the stream however and churning it by means of power outside of the stream itself the butter is developed directly from the stream and by means of the centrifugal force with which the latter is discharged; the globules of butter being detached from the butter-milk with which they are combined, by a shock or a succession of shocks and agitations immediately after its escape from the vessel and without collecting it into a body, said shocks or agitations being produced by arresting the movement of the centrifugally projected stream.

The accompanying drawings illustrate an apparatus for carrying out my process and will serve in connection with the following description, to reveal the essential features of my invention, which are also specifically pointed out in the claims.

Figure 1:
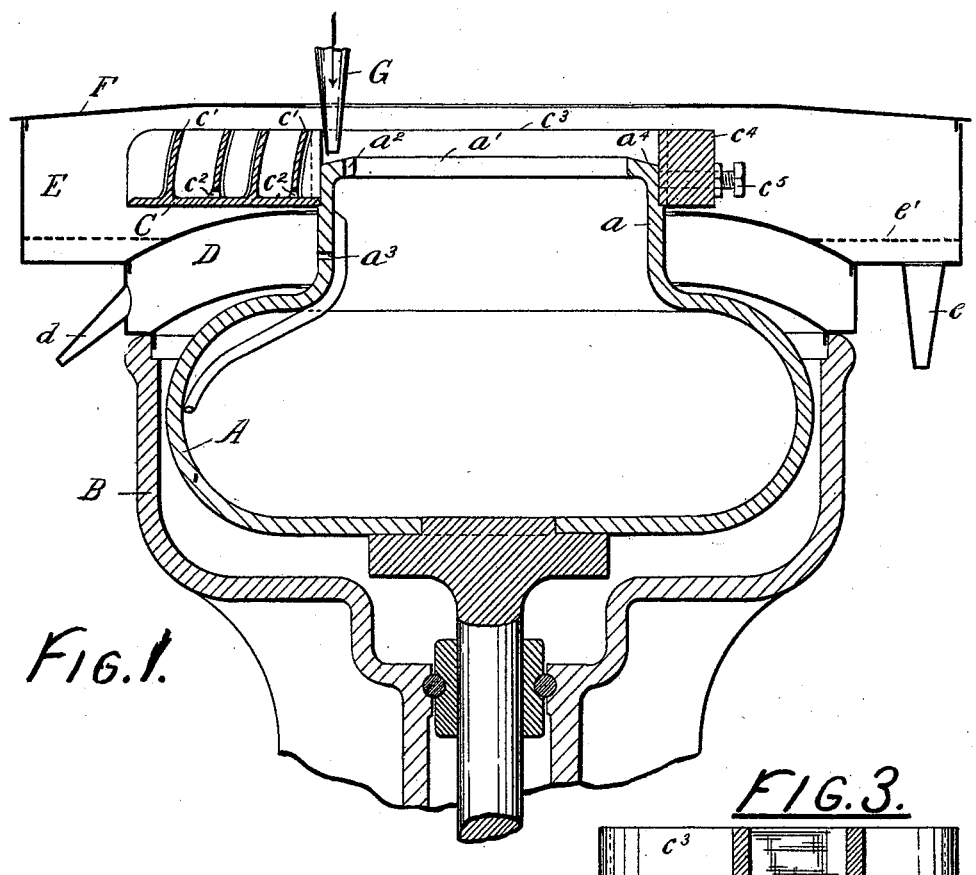
Figure 3:
Figure 2:
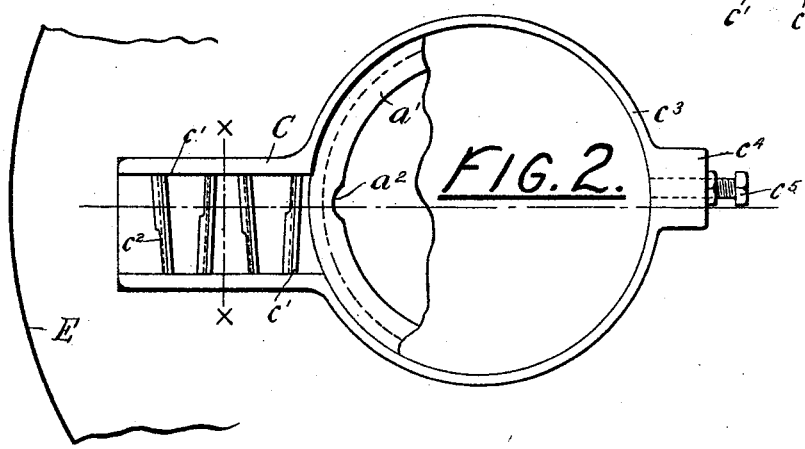

Figure 1 is a sectional elevation and Fig. 2 a partial plan view of one form of apparatus. Fig. 3 is a sectional view of the churning or agitating attachment through $x\ x$ of Fig. 2. Figs. 4 and 5 indicate some modified forms of apparatus adapted to carry out the general process.

Referring to Figs. 1 to 3 the centrifugal vessel A is represented as of the ordinary form and is supported and partially inclosed by the casing or frame B as usual.

In carrying out my process the whole milk, which may be at a temperature of 70° or upward as desired, may be continuously admitted to the vessel and the cream separated and discharged over the top $a'$ of the neck $a$ while the blue milk is delivered through the outlet $a^3$ into a receptacle D, this operation being the same as is carried out in an ordinary separator. The cream discharged from the vessel however does not undergo a separate and independent operation to develop the butter, but this, in the apparatus now being described, is accomplished directly by the very act of discharging the cream. The latter leaves the neck of the vessel in a thin stream through the eccentric depression $a^2$ in the top rim thereof as shown most clearly in Fig. 2. It is delivered from the separator vessel however at a higher temperature than is desirable for churning. In order to bring it to a proper temperature and therefore to facilitate the churning, a stream of liquid may be admitted through a nozzle G to the annular trough $a^4$ hereinafter described, and be there combined with the main stream of cream with which it will be passed through the churning attachment. The quantity of ice water or other liquid admitted through the nozzle G may be regulated as desired. Secured to the neck of the vessel just outside of the depression $a^2$ is a churning or agitating attachment C, which is represented as a flat bottomed trough provided with crosswise partitions $c'$. These partitions are not solid being provided as shown in Figs. 1, 2 and 3 with openings, as $c^2$, at opposite sides alternately. The attachment may be removably secured to the vessel A by means of a band $c^3$ inclosing the neck and a set screw $c^5$ passing through a counterbalance $c^4$. The annular gutter $a^4$, already referred to is formed by the bevel upper edge $a'$ of the vessel and the projecting band $c^3$ which forms a wall and the fixed nozzle G opens into this gutter. Receptacles D and E provided with outlet nozzles $d$ and $e$ and a cover F are supported on the frame B, and arranged to receive respectively the skim-milk and the churned cream during the operation of the machine. The milk being admitted continuously to the vessel A as usual, is separated by centrifugal action into blue milk and cream, the former of which is discharged at $a^3$ into receptacle D. The cream rising in the neck $a$ overflows the upper edge $a'$ at the point $a^2$ and is thrown outward by centrifugal force against the first partition $c'$ of the churning attachment. The shock of this sudden stoppage may collect immediately some of the globules of butter-fat but a succession of similar shocks or further agitation will be required and will be readily produced to any extent desirable in the same manner; after striking the first partition $c'$, the stream escapes through the opening $c^2$ and, being still rotated with the vessel, is again thrown by centrifugal force against the next partition, and so on as often as may be found necessary under different conditions to properly develop the butter, the partitions being as numerous and as closely arranged as may be found desirable. Finally it is discharged into the receptacle E where the butter globules may coalesce against the wall of the receptacle while the butter-milk and imperfectly churned cream, if any, escape through the perforated bottom $e'$ and nozzle $e$, or the whole mixture of butter, butter-milk and imperfectly churned cream may be removed together and subsequently separated.

In the apparatus just described the butter-fat is developed from the cream after its separation from the blue milk and while still revolving with the separator vessel. It will be seen too that this development of the butter-fat is effected directly from a stream of cream containing it by means of the progressive force of said cream; there is no massing whatever of the cream but the butter is collected directly from the stream by means of the centrifugal force with which the latter is discharged, the globules of fat being collected from the butter-milk with which they are combined by a shock or succession of shocks and agitations immediately following its escape from the vessel,—said shocks or agitations being produced by arresting the movement of the centrifugally projected stream. By means of the attachment H shown in Figs. 4 and 5 the process is carried out in substantially the same way, the cream following the course of the spiral groove $h$ after being discharged from the centrifugal vessel at $a^2$, with a constantly increasing centrifugal tendency and being beaten by the obstructing projections $h'$ or other churning device placed in the path of the rapidly moving cream, so as to develop the butter by the time the stream is finally discharged from the revolving parts at a point $h^2$ at the periphery of the attachment.

It is evident that other apparatus may be devised involving the spirit of my invention and I do not therefore limit myself to the particular constructions herein set forth but

What I claim is—

1. The improvement in the art of manufacturing butter which consists first in continuously separating the cream from the skim milk; second in continuously adding cooler liquid to the discharging cream; third in continuously churning or developing the butter fat in the cooled cream; fourth in continuously delivering the constituent parts, substantially as set forth.

2. In a centrifugal machine a separator vessel provided with a churning attachment arranged to receive the cream as it is continuously separated and discharged from said vessel, in combination with a cold water nozzle opening into said churning attachment, and means located in the attachment for agitating the cream by the continued rotation of the vessel, substantially as set forth.

In testimony whereof I affix my signature in presence of two witnesses.

PHILIP M. SHARPLES.

Witnesses:
WM. P. MERCER,
M. L. WALSH.